United States Patent [19]
Abel

[11] 4,264,465
[45] Apr. 28, 1981

[54] PROCESS FOR THE PREPARATION OF FOAM-CONTROLLED DETERGENTS

[75] Inventor: Heinz Abel, Reinach, Switzerland

[73] Assignee: Ciba-Geigy Corporation, Ardsley, N.Y.

[21] Appl. No.: 18,819

[22] Filed: Mar. 8, 1979

[30] Foreign Application Priority Data

Jun. 7, 1978 [CH] Switzerland .................... 62253/78

[51] Int. Cl.[3] .................... B01D 17/00; C11D 7/56; C11D 11/00

[52] U.S. Cl. .................................... 252/99; 252/135; 252/174.13; 252/174.15; 252/321; 252/358; 252/539; 252/540

[58] Field of Search ............... 252/99, 135, 539, 540, 252/174.13, 174.15, 321, 358

[56] References Cited

U.S. PATENT DOCUMENTS

| | | | |
|---|---|---|---|
| 3,661,793 | 5/1972 | Curtis | 252/321 |
| 3,697,442 | 10/1972 | Lieberman | 252/321 |
| 3,829,386 | 8/1974 | Wegst et al. | 252/135 |
| 3,843,558 | 10/1974 | Farminer et al. | 252/358 |
| 3,933,672 | 1/1976 | Bartolotta et al. | 252/116 |
| 4,104,186 | 8/1978 | Caffarel et al. | 252/89 R |
| 4,136,045 | 1/1979 | Gault et al. | 252/135 |

FOREIGN PATENT DOCUMENTS

| | | | |
|---|---|---|---|
| 525433 | 5/1956 | Canada | 252/358 |
| 2279843 | 7/1974 | France . | |
| 1450580 | 9/1976 | United Kingdom . | |
| 1451951 | 10/1976 | United Kingdom . | |

*Primary Examiner*—P. E. Willis, Jr.
*Attorney, Agent, or Firm*—Edward McC. Roberts; John P. Spitals

[57] ABSTRACT

The present invention relates to a process for the preparation of foam-controlled pulverulent detergents. In this process (a) 80 to 99.9 parts by weight of a pulverulent, water-soluble, non-surfactant constituent of the detergent are mixed homogeneously with (b) 0.1 to 20 parts by weight of silicone oil or silicone oil/silica mixtures, which are homogeneously dispersed or dissolved in a solvent, the solvent is then removed and the residue is mixed with further constituents necessary for the preparation of a detergent.

If desired, the detergent can also be treated as a whole with component (b). The process enables the detergents (washing powders) of any desired foam capacity to be prepared.

24 Claims, No Drawings

PROCESS FOR THE PREPARATION OF FOAM-CONTROLLED DETERGENTS

The present invention relates to a process for the preparation of foam-controlled detergents using finely divided anti-foams based on silicone oil.

As is known, high-lather detergents are not very suitable for use in front-loading washing machines. Especially at relatively high temperatures, for example at 80° to 100° C., vigorous foaming results in the cleaning liquors foaming over, with considerable losses of detergent substance. It has also been found that large amounts of foam suppress the mechanical agitation of the goods to be cleaned, and for this reason high-foam detergents do not develop their full cleansing power in washing machines.

Polyglycol ethers and polyglycol esters, for example polyglycol phosphate ester, and also long-chain halogenated hydrocarbons, have already been proposed for reducing the foaming of detergents which contain high-foaming anionic detergent substances, for example those of the sulfonate or sulfate type. (cf., for example, German Auslegeschrift No. 1,467,614, German Offenlegungsschrift No. 2,532,804 and U.S. Pat. No. 3,869,412).

Anti-foams based on silicone oil are also known but their use in detergents has, however, various disadvantages.

Thus, the use of silicone oils, especially in aqueous systems, always demands formulation of the silicone oils, for example with the aid of emulsifiers or solvents, in order to obtain them in a finely divided and thus effective form.

The incorporation of such an emulsion or solution is as a rule effected by spraying onto the formulated detergent, by which means, however, an adequate state of fine division of the anti-foam cannot be achieved, and thus only an inadequate, i.e. only a short-term, effect can be achieved.

This is because these silicone oil formulations (emulsions and solutions) are relatively unstable in the wash liquors; because of the inadequate state of fine division, droplets form relatively rapidly and these droplets are deposited on the goods to be washed (spotting).

Another disadvantage of these silicone oil formulations is that they have to be employed in relatively large amounts in order to show any effect at all (supression of foaming).

The object of the invention is, therefore, the provision of a novel process for the preparation of foam-controlled detergents by improved incorporation of anti-foams based on silicone oil in the formulated detergents or one of their components, an improved effect being achieved with, at the same time, a reduction in the amount employed.

It has now been found that the stated object can be achieved according to the invention and the disadvantages mentioned can be overcome if anti-foams based on silicone oil are dissolved in a solvent, the solution is mixed homogeneously with a water-soluble constituent of the detergent or optionally also with the said detergent as a whole, and the solvent is removed again and, if only one constituent of the detergent has been used, this constituent is employed to prepare a detergent.

The subject of the present invention is, therefore, a process for the preparation of foam-controlled pulverulent detergents, which comprises homogeneously mixing (a) 80 to 99.9 parts by weight of a pulverulent, water-soluble, non-surfactant constituent of the detergent with (b) 0.1 to 20 parts by weight of silicone oil or silicone oil/silica mixtures, which are homogeneously dispersed or dissolved in a solvent, then distilling off the solvent, the solvent having a boiling point which is below the melting point of component (a), and mixing the residue with further constituents necessary for the preparation of a detergent.

Preferably, 85 to 99.9 and especially 90 to 99.9 or 99.5 parts by weight of component (a) and, correspondingly, 0.1 to 15 and especially 0.1 or 0.5 to 10 parts by weight of component (b) are employed in the process according to the invention.

In a further embodiment, the removal of the solvent in the process according to the invention can be effected by drying, especially spray-drying.

The invention also relates to the foam-controlled pulverulent detergents prepared according to the process.

Suitable components (a) are, as a rule, the pulverulent, water-soluble, non-surfactant constituents of detergents, which are present in the detergent in such an adequate amount that, after the modification according to the invention by component (b), they can impart the desired characteristics in respect of foaming (foam control) to the total detergent.

Preferred water-soluble components (a) are, therefore: builders (phosphates and condensed phosphates), bleaching agents, salts having an alkaline or neutral reaction, especially neutral salts, alkali metal silicates and optionally also mixtures of these constituents.

Depending on the amount of component (b) employed (0.1 to 20 parts by weight), it is possible to treat all or only a portion of the constituents mentioned for (a) with component (b) (for example all of the builders used in a detergent are previously treated with component (b)) and then to use these constituents for the preparation of the detergent.

Thus, the detergent components (a) treated with component (b) can, depending on the amount of silicone oil used, make up, for example, 0.025 to 60, especially to 50 and optionally to 30 percent by weight of the detergent. The amount of silicone oil (or component (b)), which is finally present in the detergents can amount to about 0.001 to 5 and especially 0.0025 to 2.5 percent by weight, based on the detergent.

Surface active constituents (sufactants) are not suitable for treatment with component (b) since they would emulsify the silicone oil and thus have an adverse influence on foam control.

If desired, the detergent can also be treated as a whole (not only the constituents mentioned under (a)) with component (b). This embodiment is, however, considerably less economical since, for example, significantly larger volumes of solvent have to be removed by distillation or by other means when preparing the foam-controlled detergent.

Apart from containing the indicated constituents modified by component (b), the pulverulent detergents prepared according to the invention have a conventional composition. Thus, they contain, for example, builders, surfactants, inorganic or organic salts having an alkaline or neutral reaction, alkali metal silicates, bleaching agents (percompounds), stabilisers, for example magnesium silicates, fluorescent brightening agents, perfumes and dyes, softeners, anti-microbial agents, enzymes, corrosion inhibitors and soil-suspending agents (soil carriers). The detergents can contain up to 60 percent by weight of phosphates, preferably alkali metal salts of condensed phosphates, such as pyrophosphates, tri- or tetra-phosphates or metaphosphates, as builders.

The condensed phosphates can also be wholly or partly replaced by organic complex-forming agents which bind the calcium hardness of the water. Examples of such compounds are the alkali metal salts of nitrilotriacetic acid or ethylenediaminotetraacetic acid, and also organo-phosphorus compounds, such as aminoalkylenephosphonic acids and hydroxyethane-1,1-diphosphonic acid and their alkali metal salts.

In addition, suitable builders can also be polymers of unsaturated carboxylic acids and their water-soluble salts, for example polymaleic acid, polyitaconic acid, polymesaconic acid, polyfumaric acid, polyaconitic acid, polymethylenemalonic acid, polycitraconic acid or copolymers of the said unsaturated acids and suitable comonomers. Further substances which are suitable as builders (as a rule as additional builders which can replace a proportion of the phosphates) are zeolites or aluminium silicates, which, for example, can bind calcium ions and magnesium ions as a complex (German Offenlegungsschriften Nos. 2,529,685 and 2,605,054). Suitable surfactants which can be present in the detergents in an amount of about 2 to 50 percent by weight, are, in particular, anionic, amphoteric, zwitter-ionic or non-ionic surfactants.

The anionic surfactants are, for example, those of the sulfonate or sulfate type, such as the alkyl benzenesulfates having, for example, 6 to 18 carbon atoms in the alkyl moiety, especially n-dodecyl benzenesulfonate, and also olefine-sulfonates, such as are obtained, for example, by sulfonation of primary or secondary aliphatic monoolefines with gaseous sulfur trioxide and subsequent alkaline or acid hydrolysis, and also alkylsulfonates having, for example, preferably 10 to 24 carbon atoms, such as are obtainable from n-alkanes by sulfochlorination or sulfoxidation and subsequent hydrolysis or neutralisation or by adding bisulfite onto olefines. Further suitable compounds are α-sulfo-fatty acid esters and primary and secondary alkylsulfates of higher molecular weight alcohols. Further compounds of this category which can be present in the detergents if desired, are the higher molecular weight sulfated partial ethers and partial esters of polyhydric alcohols, such as the alkali metal salts or monoalkyl ethers and the mono-fatty acid esters of glycerol monosulfate or of 1,2-dihydroxypropanesulfonic acid. Sulfates of ethoxylated and/or propoxylated fatty acid amides and alkylphenols and also fatty acid taurides can also be used. Further suitable compounds are the sulfonated benzimidazole derivatives. Alkali metal soaps of fatty acids of natural or synthetic origin, for example the sodium soaps of coconut fatty acids, palm kernel fatty acids or tallow fatty acids, are also suitable as anionic detergent bases.

Amphoteric surfactants are, for example, derivatives of aliphatic secondary and tertiary amines or aliphatic derivatives of heterocyclic secondary and tertiary amines, in which the aliphatic radicals can be straight-chain or branched and in which one of the aliphatic radicals contains about 8 to 18 carbon atoms and at least one aliphatic radical carries an anionic group conferring solubility in water.

Zwitter-ionic surfactants are, for example, derivatives of aliphatic quaternary ammonium, phosphonium and sulfonium compounds, in which the aliphatic radicals can be straight-chain or branched, one of the aliphatic radicals contains about 8 to 18 carbon atoms and one of these groups carries an anionic group conferring solubility in water.

Examples of such surfactants are alkylbetaines and especially alkylsulfobetaines, such as 3-(N,N-dimethyl-N-alkylammonium)-propane-1-sulfonate and 3-(N,N-dimethyl-N-alkylammonium)-2-hydroxypropane-1-sulfonate.

The anionic surfactants can be in the form of the sodium, potassium and ammonium salts and also in the form of salts of organic bases, such as mono-, di- and tri-ethanolamine. If the said anionic and zwitter-ionic compounds possess an aliphatic hydrocarbon radical, this radical is preferably straight-chain and can contain 8 to 26 and especially 8 to 22 carbon atoms. In the compounds which contain an araliphatic hydrocarbon radical, the alkyl chains, which are preferably unbranched, contain on average about 6 to 18 carbon atoms.

Non-ionic surfactants are in particular polyglycol ether derivatives of aliphatic or cycloaliphatic alcohols, saturated or unsaturated fatty acids and alkylphenols, which can contain about 3 to 30 glycol ether groups and 8 to 20 carbon atoms in the (aliphatic) hydrocarbon radical and about 6 to 18 carbon atoms in the alkyl radical of the alkylphenols. Polyglycol ether derivatives in which the number of ethylene glycol ether groups is 5 to 25 and in which the hydrocarbon radicals are derived from straight-chain primary alcohols having 12 to 18 carbon atoms or from alkylphenols having a straight-chain alkyl chain containing 6 to 14 carbon atoms are particularly suitable. If desired, the last-mentioned polyethylene glycol ethers can be further modified by adding on propylene oxide, for example 3 to 25 mols.

Further suitable non-ionic surfactants are the water-soluble polyethylene oxide adducts with propylene glycol, ethylenediaminopolypropylene glycol and alkylpolypropylene glycol having 1 to 10 carbon atoms in the alkyl chain, which contain 20 to 250 ethylene glycol ether groups and 10 to 100 propylene glycol ether groups. The said compounds usually contain 1 to 5 ethylene glycol units per propylene glycol unit. Non-ionic compounds of the type of the long-chain amine-oxides and sulfoxides, which if desired can also be ethoxylated, can also be used.

The salts having an alkaline or neutral reaction are in particular sodium chloride, sodium sulfate and sodium carbonate or mixtures thereof. Alkali metal silicates are sodium silicates or potassium silicates and also mixtures thereof. Customary bleaching agents are, for example, perborates, caroates ($KHSO_5$), perbenzoates, peroxyphthalates or percarbonates (alkali metal salts), which as a rule are used together with activators, for example tetraacetylethylenediamine.

The fluorescent brightening agents are usually diphenyldistyryl compounds and derivatives of aminostilbenesulfonic acid or of diaminostilbenesulfonic acid, of diarylpyrazolines, of carbostyril, of 1,2-di-(2-benzoxazolyl)- or 1,2-di-(2-benzimidazolyl)-ethylene, of benzoxazolyl-thiophene and of coumarin. The amount of fluorescent brightening agent is about 0.001 to 2 percent by weight, based on the detergent.

Corrosion inhibitors are, for example, sodium aluminate or sodium zincate, whilst suitable soil suspending agents (soil carriers) can be sodium carboxymethylcellulose, sodium cellulose-sulfate, lower alkyl- and hydroxyalkyl-cellulose ethers, such as ethylhydroxyethylcellulose, ethylhydroxypropylcellulose and hydroxyethylcellulose and also polyvinylpyrrolidone.

Silicone oils suitable as component (b) are as a rule organopolysiloxanes (if desired with terminal hydroxyl groups), for example polyalkyl-, polyaryl- or polyarylalkyl-siloxanes, cycloaliphatic polysiloxanes or siloxanes which are modified by hydroxyalkylene groups and have molecular weights of 1,000 to 100,000, especially polyalkylsiloxanes in which alkyl contains 1 to 6 carbon atoms, which have a viscosity at 25° C. of 1 to 15,000 and preferably of 50 to 3,000 centipoise.

Specific examples of the abovementioned polyalkylsiloxanes are polydimethylsiloxane, polydiethylsiloxane, polydipropylsiloxane, polymethylethylsiloxane, polymethyl-propylsiloxane, polydibutylsiloxane, polydihexylsiloxane or polydioctylsiloxane. Polydimethylsiloxanes are preferred.

The silicone oils are as a rule known commercial products, which in addition to the polysiloxanes can optionally also contain customary additives, for example colloidal silica, or surface-active assistants, for example emulsifiers based on polyethylene glycol.

The silicone oils can thus be employed together with surface-active assistants, for example the said emulsifiers based on polyethylene glycol, or preferably emulsifier-free.

If desired, component (b) additionally contains a liquid hydrocarbon. Hydrocarbons which can be used are aliphatic, cycloaliphatic or aromatic hydrocarbons which are liquid at room temperature and under normal pressure.

These hydrocarbons on average have about 6 to 25 carbon atoms and a boiling point of at least 65° C.

Preferred hydrocarbons are hexane, heptane, octane, refined light petroleum, naphtha, benzene, toluene, xylene and especially paraffinic or naphthenic mineral oil. If desired, mixtures of two or more hydrocarbons can be used.

The weight ratios of the hydrocarbons, the colloidal silica and the polyalkylsiloxanes contained in component (b) to one another can be, for example, (90 to 95):(4.75 to 9.5):(0.25 to 0.5).

The process according to the invention can be carried out by mixing the silicone oil component (b), which is homogeneously dispersed or dissolved in a solvent, together with component (a) (or if desired the entire detergent) to a slurry and then distilling off the solvent, which should have a boiling point which is below the melting point of component (a). Instead of by distillation, the solvent can also be removed by drying, especially spray-drying. The said solvent, into which the silicone oil-containing component (b) is initially introduced (at room temperature (20° to 25° C.) or at higher temperatures, corresponding to the boiling points of the solvents used), is also used if component (b) is present as a mixture with the aliphatic, cycloaliphatic or aromatic hydrocarbons, the amount of which can be up to 95 percent by weight, based on the total component (b).

Suitable solvents are, for example, aliphatic alcohols having 1 to 8 carbon atoms, halogenated hydrocarbons having 1 to 2 carbon atoms, ketones having 3 to 10 carbon atoms, carboxylic acid esters having 2 to 6 carbon atoms or substituted or unsubstituted benzenes. Specific examples are methanol, ethanol, propanol, isopropanol, butanol, amyl alcohol, hexanol, 2-ethylhexanol, methylene chloride, chloroform, carbon tetrachloride, tetrachloroethane, perchloroethylene, acetone, methyl ethyl ketone, diethyl ketone, methyl n-propyl ketone, methyl t-butyl ketone, di-n-propyl ketone, hexan-2-one, hexan-3-one, methyl acetate, ethyl acetate, propyl acetate, butyl acetate, methyl formate and ethyl formate, benzene, toluene and also the xylenes. The amount of the solvent can vary within wide limits and can be, for example, 10 to 100 times the amount of component (b).

Those solvents which have a boiling point of not more than 150° C. are preferred. The solvents should be so chosen that the boiling point of the solvent is below the melting point of component (a), so that melting of the components during the distillation or drying process is avoided. This is because an additional comminuting process, for example a grinding process, would then be necessary in order to convert this melt to a dry free-flowing powder.

If spray-drying is used to remove the solvent, non-combustible solvents are preferably employed.

The incorporation of component (a) modified with silicone oil or mixtures containing silicone oil into the other constituents which are necessary for the preparation of a detergent-the said constituents as a rule already being in the form of a mixture-is effected by known and conventional methods, for example by admixing and homogenising in mixing installations suitable for this purpose.

The pulverulent detergents thus obtained can be in the form of powders, agglomerates or granules. They can be employed either as domestic detergents or as detergents for industrial washing processes.

The term pulverulent is used here in the general sense in which it is customarily employed in the context of detergents and cleansing agents, so that it covers particle sizes from finely powdered to coarse grained, including granules and agglomerates. The process according to the invention enables pulverulent detergents with any desired lather value to be prepared in a simple manner. The desired foam control, especially foam suppression, is stable during the entire washing process, which can take place over a wide temperature range (30° to 100° C.). Agglomeration of the silicone oil component, which results in spotting on the goods to be washed, which is undesirable especially in the case of domestic laundry, does not take place.

In the following examples, parts and percentages are by weight unless stated otherwise.

EXAMPLE 1

A. 340 g of isopropanol are mixed homogeneously with 50 g of silicone oil (SAG 100—tradename of Union Carbide) in a heatable stirred kettle. 610 g of tetrapotassium pyrophosphate are then added and the components are mixed to a homogeneous slurry. The mixture is then heated and the isopropanol is removed by distillation and is separated off by means of a condenser, for re-use. Stirring of the mixture is continued during the entire distillation. A dry, odour-free powder (preparation A) results in quantitative yield (660 g).

B. The powder thus obtained is used to prepare a low-lather detergent, which has the following composition:

| | |
|---|---|
| 10% | of dodecyl benzenesulfonate |
| 5% | of tallow alcohol ethoxylate [R—$(OCH_2CH_2)_{25}OH$] |
| 30% | of tetrapotassium pyrophosphate |
| 10% | of preparation A |
| 35% | of sodium perborate |

-continued

| | |
|---|---|
| 0.1% | of the fluorescent brightening agent of the formula (101) |

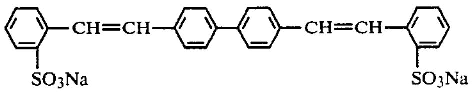

| | |
|---|---|
| 1.5% | of carboxymethylcellulose |
| 2.4% | of sodium silicate |
| 0.2% | of magnesium silicate |
| 0.8% | of ethylenediaminetetraacetic acid |
| 5% | of sodium sulfate |
| 100% | of detergent |

The constituents are homogeneously dispersed in a suitable mixing installation.

C. Comparative foam test

The test was carried out in accordance with German Industrial Standard (DIN) 53902. Amount employed: 10 g/l of detergent. The detergent is shaken for 1 minute and the amount of foam is then measured 1 minute and 5 minutes after the end of shaking.

| Test results: | Foam (ml) | |
|---|---|---|
| Detergent | 1 minute | minutes |
| Detergent according to B | 10 | 10 |
| without the addition of preparation A. | 650 | 390 |
| Detergent according to B. with 5% of preparation (A) | 60 | 10 |

In place of tetrapotassium pyrophosphate, it is also possible to treat sodium perborate or sodium sulfate or also the total detergent as described in (A), comparable results being obtained. However, the treatment of the total detergent is as a rule less economical than the treatment of the said constituents of the detergent.

EXAMPLE 2

The following preparations are prepared by a method analogous to that for the preparation of preparation A in Example 1:

| | | |
|---|---|---|
| B. | 90 | parts of sodium tripolyphosphate |
| | 10 | parts of silicone oil (SAG 100) |
| | 30 | parts of isopropanol |
| | 100 | parts |

After distilling off the solvent, preparation B is obtained. 0.05% to 5% (based on the detergent) of this preparation can be employed in a detergent.

| | | |
|---|---|---|
| C. | 80 | parts of sodium tripolyphosphate |
| | 20 | parts pf silicone oil (SAG 100) |
| | 30 | parts of isopropanol |
| | 100 | parts |

After distilling off the solvent, preparation C is obtained. 0.025% to 2.5% of this preparation can be employed in a detergent.

| | | |
|---|---|---|
| D. | 99.5 | parts of sodium tripolyphosphate |
| | 0.5 | part of silicone oil (SAG 100) |
| | 35 | parts of isopropanol |

-continued

| | | |
|---|---|---|
| | 100 | parts |

After distilling off the solvent, preparation D is obtained. 0.5% to 30% of this preparation can be employed in a detergent.

| | | |
|---|---|---|
| E. | 90 | parts of sodium sulfate |
| | 10 | parts of silicone oil (SAG 100) |
| | 30 | parts of isopropanol |
| | 100 | parts |

After distilling off the solvent, preparation E is obtained. 0.05% to 5% of this preparation can be employed in a detergent. The amount of silicone oil can be varied within the same range as in the case of preparations (C) and (D) for corresponding amounts employed in the formulation.

| | | |
|---|---|---|
| F. | 90 | parts of sodium perborate |
| | 1 | parts of silicone oil (SAG 100) |
| | 30 | parts of isopropanol |

The solvent is distilled off in vacuo at about 60° C., since the perborate melts at higher temperatures. 91 parts of Preparation F are obtained. 0.5% to 25% of this preparation can be employed as an additive in detergents.

| | | |
|---|---|---|
| G. | 95 | parts of anhydrous sodium metasilicate |
| | 5 | parts of silicone oil (SAG 100) |
| | 40 | parts of isopropanol |
| | 100 | parts |

After distilling off the solvent, preparation G is obtained and this can be added in the same amounts as preparation E to detergents.

| | | |
|---|---|---|
| H. | 97.8 | parts of sodium carbonate |
| | 2.2 | parts of silicone oil (SAG 100) |
| | 40 | pats of isopropanol |

After distilling off the solvent, 100 parts of preparation H are obtained and this can be added in the same amounts as preparation E to detergents. In place of the said silicone oil, it is also possible to use other commercially available silicone oils.

EXAMPLE 3

Foam-controlled detergents with the following composition are prepared as described in Example (1 B)

| | | |
|---|---|---|
| 3.1 | 31% | of sodium coconut fatty soap |
| | 30% | of preparation D |
| | 5% | of sodium silicate (waterglass, dry) |
| | 0.05% | of the fluorescent brightening agent of the formula (101) |
| | 5% | of sodium perborate |
| | 3% | of magnesium silicate |
| | 25.95% | of sodium sulfate |
| | 100% | of foam controlled heavy-duty detergent |
| 3.2 | 11% | of dodecyl benzenesulfonate |
| | 3% | of the reaction product of 1 mol of octylphenol and 12 mols of ethylene oxide |
| | 14% | of potassium hexametaphosphate |
| | 1% | of preparation B |

-continued

| | | |
|---|---|---|
| | 10% | of sodium perborate |
| | 20% | of sodium carbonate (calcined) |
| | 1% | of carboxymethylcellulose |
| | 2% | of magnesium silicate |
| | 38% | of sodium sulfate |
| | 100% | of low-lather (foam-controlled) heavy-duty detergent |
| 3.3 | 10% | of dodecyl benzenesulfonate |
| | 3% | of the reaction product of 1 mol of octyl-phenol and 16 mols of ethylene oxide |
| | 1% | of coconut fatty acid monoethanolamide |
| | 3% | of sodium carbonate (calcined) |
| | 2% | of preparation H |
| | 35% | of sodium tripolyphosphate |
| | 46% | of sodium sulfate |
| | 100% | of low-lather detergent for coloureds |
| 3.4 | 12% | of the reaction product of 1 mol of nonyl-phenol and 2 mols of ethylene oxide |
| | 20% | of sodium tripolyphosphate |
| | 25% | of sodium carbonate (calcined) |
| | 15.5% | of sodium silicate |
| | 0.5% | of preparation G |
| | 2% | of carboxymethylcellulose |
| | 25% | of sodium sulfate (calcined) |
| | 100% | of a low-lather detergent based on non-ionic constituents |
| 3.5 | 40% | of fatty alcohol sulfate ($C_{12}H_{25}OSO_3Na$) |
| | 5% | of dodecyl benzenesulfonate |
| | 3% | of coconut fatty acid monoethanolamide |
| | 1% | of toluenesulfonate |
| | 1% | of carboxymethylcellulose |
| | 22% | of sodium tripolyphosphate |
| | 27.975% | of sodium sulfate |
| | 0.025% | of preparation C |
| | 100% | of low-lather light-duty detergent |

Foam test as described in (1 C):

| Detergent | Foam (ml) 1 minute | 5 minutes |
|---|---|---|
| 3.1 | 60 | 40 |
| without the addition of preparation D | 280 | 150 |
| 3.2 | 30 | 10 |
| without the addition of preparation B | 280 | 150 |
| 3.3 | 10 | 5 |
| without the addition of preparation H | 240 | 100 |
| 3.4 | 140 | 50 |
| without the addition of preparation G | 290 | 160 |
| 3.5 | 150 | 90 |
| without the addition of preparation C | 260 | 120 |

What is claimed is:

1. A process for the preparation of foam-controlled pulverulent detergents, which comprises homogeneously mixing (a) 80 to 99.9 parts by weight of a pulverulent, water-soluble, non-surfactant constituent of the detergent selected from the group consisting of a builder, a bleaching agent, and sodium sulfate, with (b) 0.1 to 20 parts by weight of silicone oil or silicone oil/-silica mixtures, which are homogeneously dispersed or dissolved in a solvent selected from the group consisting of an aliphatic alcohol having 1 to 8 carbon atoms, a halogenated hydrocarbon having 1 or 2 carbon atoms, a ketone having 3 to 10 carbon atoms, a carboxylic acid ester having 2 to 6 carbon atoms or a substituted or unsubstituted benzene, then distilling off the solvent, the solvent having a boiling point which is below the melting point of component (a), and mixing the residue with further constituents necessary for the preparation of a detergent.

2. A process for the preparation of foam-controlled pulverulent detergents, which comprises homogeneously mixing (a) 80 to 99.9 parts by weight of a pulverulent, water-soluble, non-surfactant constituent of the detergent selected from the group consisting of a builder, a bleaching agent, and sodium sulfate, with (b) 0.1 to 20 parts by weight of silicone oil or silicone oil/-silica mixtures, which are homogeneously dispersed or dissolved in a solvent selected from the group consisting of an aliphatic alcohol having 1 to 8 carbon atoms, a halogenated hydrocarbon having 1 or 2 carbon atoms, a ketone having 3 to 10 carbon atoms, a carboxylic acid ester having 2 to 6 carbon atoms or a substituted or unsubstituted benzene, the solvent having a boiling point which is below the melting point of component (a), and then drying the mixture and mixing the latter with further constituents necessary for the preparation of a detergent.

3. A process according to either of claims 1 or 2, wherein the amount of component (a) is 85 to 99.9 and the amount of component (b) is 0.1 to 15 parts by weight.

4. A process according to claim 3, wherein the amount of component (a) is 90 to 99.9 and the amount of component (b) is 0.1 to 10 parts by weight.

5. A process according to either of claims 1 or 2, wherein a polyalkyl-, polyaryl or polyarylalkyl-siloxane, a cycloaliphatic polysiloxane or a siloxane modified by hydroxyalkylene groups, which has a molecular weight of 1,000 to 100,000, is used as component (b).

6. A process according to claim 5, wherein a polyalkylsiloxane, in which alkyl contains 1 to 6 carbon atoms, with a viscosity at 25° C. of 1 to 15,000 centipoise is used as component (b).

7. A process according to claim 5, wherein component (b) additionally contains aliphatic, cycloaliphatic or aromatic hydrocarbons which are liquid at room temperature and under normal pressure and the proportion of which is up to 95 percent by weight, based on the siloxane or siloxane/silicon dioxide (silica)/hydrocarbon mixtures.

8. A process according to claim 5, wherein component (b) is a mixture of aliphatic, cycloaliphatic or aromatic hydrocarbons, which are liquid at room temperature and under normal pressure, colloidal silica and polyalkylsiloxanes, the weight ratios being (90 to 95):(4.75 to 9.5):(0.25 to 0.5).

9. A process according to claim 5, wherein a polyalkyl-, polyaryl or polyarylalkyl-siloxane, a cycloaliphatic polysiloxane or a siloxane modified by hydroxyalkylene groups, which has a molecular weight of 1,000 to 100,000, is used as a mixture with colloidal silica, which can be hydrophobic, as component (b).

10. A process according to claim 6, wherein a polyalkylsiloxane, with a viscosity at 25° C. of 50 to 3,000 centipose, is used as component (b).

11. A process according to claim 7, wherein the hydrocarbons contain on average 6 to 25 carbon atoms.

12. A process according to claim 11, wherein the hydrocarbons are paraffinic and/or naphthenic mineral oils.

13. A process according to claim either of claims 1 or 2, wherein the solvent has a boiling point of not more than 150° C.

14. A proces according to either of claims 1 or 2 , wherein component (a) comprises only a proportion of the non-surfactant constituent, which is treated with component (b) and is used for the preparation of the detergent.

15. A process according to claim 14, wherein the proportion of component (a) which has been treated with component (b) is present in the detergent to the extent of 0.025 to 50 percent by weight.

16. A process according to claim 15, wherein the amount of component (b) in the detergent is 0.001 to 5 percent by weight.

17. A process according to claim 15, wherein the proportion of component (a) which has been treated with component (b) is present in the detergent to the extent of 0.025 to 30 percent by weight.

18. A process according to claim 2, wherein the mixture is spray-dried and then mixed with further constituents necessary for the preparation of a detergent.

19. A process according to either of claims 1 or 2 wherein the builder is a phosphate and the bleaching agent is sodium perborate.

20. A process according to claim 19, wherein the builder is a condensed phosphate.

21. A foam-controlled pulverulent detergent prepared by the process of either of claims 1 or 2.

22. A foam-controlled pulverulent detergent according to claim 21, which contains builders, bleaching agents, modified with silicone oil or silicone oil/silica mixtures, the total amount of these modified constituents being 0.025 to 60 percent by weight, based on the detergent.

23. A foam-controlled pulverulent detergent according to claim 22, wherein the amount of silicone oil or silicone oil/silica mixture in the detergent is 0.001 to 5 percent by weight.

24. A foam-controlled pulverulent detergent according to claim 22, wherein the total amount of said modified constituents being 0.025 to 30 percent by weight, based on the detergent.

* * * * *